(12) United States Patent
Yamamoto (10) Patent No.: US 10,877,710 B2
(45) Date of Patent: Dec. 29, 2020

(54) TEST CHART AND IMAGE FORMING APPARATUS

(71) Applicant: KYOCERA Document Solutions Inc., Osaka (JP)

(72) Inventor: Takenori Yamamoto, Osaka (JP)

(73) Assignee: Kyocera Document Solutions, Inc.

( * ) Notice: Subject to any disclaimer, the term of this patent is extended or adjusted under 35 U.S.C. 154(b) by 0 days.

(21) Appl. No.: 16/694,566

(22) Filed: Nov. 25, 2019

(65) Prior Publication Data

US 2020/0167109 A1    May 28, 2020

(30) Foreign Application Priority Data

Nov. 27, 2018  (JP) ................... 2018-221745

(51) Int. Cl.
*G06F 3/12* (2006.01)
*G06T 3/60* (2006.01)
*G06T 3/20* (2006.01)

(52) U.S. Cl.
CPC ............ *G06F 3/1256* (2013.01); *G06F 3/121* (2013.01); *G06F 3/1208* (2013.01); *G06T 3/20* (2013.01); *G06T 3/60* (2013.01)

(58) Field of Classification Search
CPC ...... G06F 3/1256; G06F 3/1208; G06F 3/121; G06F 3/12; G06T 3/30; G06T 3/20
See application file for complete search history.

(56) References Cited

U.S. PATENT DOCUMENTS

| | | | |
|---|---|---|---|
| 2015/0347059 A1* | 12/2015 | Sumi | .................... G06K 15/102 358/1.14 |
| 2016/0065753 A1* | 3/2016 | Tachibana | ............... G06F 3/121 358/1.14 |

FOREIGN PATENT DOCUMENTS

JP    2010-212745    9/2010

* cited by examiner

*Primary Examiner* — Juan M Guillermety (57) ABSTRACT

A test chart includes an indication image along a primary scanning direction on a first face, the indication image having a straight-line shape; a folding back position image along a secondary scanning direction on a second face; and a first scale image that has a scale along the secondary scanning direction on the second face. Further, when the second face is folded back to the first face at the folding back position image, the indication image indicates a value on the scale of the first scale image such that the value corresponds to a position error in the secondary scanning direction between images on the first and second faces.

5 Claims, 14 Drawing Sheets

TEST CHART AND IMAGE FORMING APPARATUS

CROSS-REFERENCE TO RELATED APPLICATIONS

This application relates to and claims priority rights from Japanese Patent Application No. 2018-221745, filed on Nov. 27, 2018, the entire disclosures of which are hereby incorporated by reference herein.

BACKGROUND

1. Field of the Present Disclosure

The present disclosure relates to a test chart and an image forming apparatus.

2. Description of the Related Art

An image forming apparatus prints register marks on a front face and a back face, detects positions of the register marks using a line sensor, determines a difference between the register marks positions on the front and back faces, and adjusts a printing position of an image in accordance with the determined difference so as to agree a position of an image on a front face and a position of an image on a back face with each other.

However, such an image forming apparatus requires a scanner or a sensor to scan a test chart printed for such adjustment of the image forming apparatus, and it causes a high cost of the image forming apparatus.

SUMMARY

A test chart according to an aspect of the present disclosure includes an indication image along a primary scanning direction on a first face, the indication image having a straight-line shape; a folding back position image along a secondary scanning direction on a second face; and a first scale image that has a scale along the secondary scanning direction on the second face. Further, when the second face is folded back to the first face at the folding back position image, the indication image indicates a value on the scale of the first scale image such that the value corresponds to a position error in the secondary scanning direction between images on the first and second faces.

An image forming apparatus according to an aspect of the present disclosure includes an image outputting unit, a control unit, an input device, and a correction processing unit. The image outputting unit is configured to perform duplex printing of images on first and second faces in a predetermined printing manner. The control unit is configured to control the image outputting unit to perform duplex printing of a test chart image on a first face of a print sheet and a test chart image on a second face of the print sheet in the basis of test chart image data and thereby generate the aforementioned test chart. The input device is configured to receive manual input of a value of a position error indicated by the test chart. The correction processing unit is configured to generate correction data for the image outputting unit in order to reduce the position error, on the basis of the value of the position error received by the input device.

These and other objects, features and advantages of the present disclosure will become more apparent upon reading of the following detailed description along with the accompanied drawings.

DETAILED DESCRIPTION

Hereinafter, embodiments according to an aspect of the present disclosure will be explained with reference to drawings.

Embodiment 1

Figure 1:
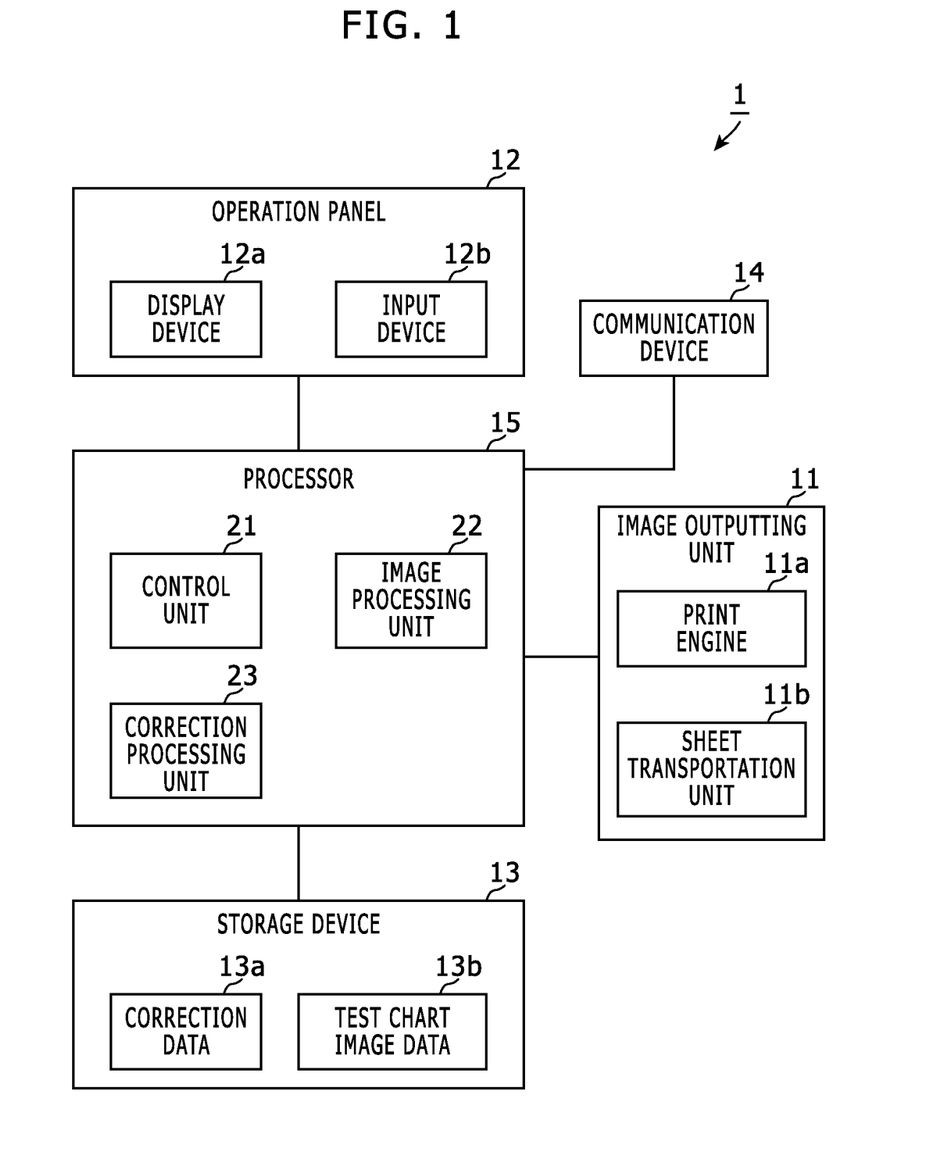
FIG. 1 shows a block diagram that indicates a configuration of an image forming apparatus according to an embodiment of the present disclosure.

FIG. 1 shows a block diagram that indicates a configuration of an image forming apparatus according to an embodiment of the present disclosure. The image forming apparatus shown in FIG. 1 is a printer, a multi function peripheral or the like, and includes an image outputting unit 11, an operation panel 12, a storage device 13, a communication device 14, and a processor 15.

The image outputting unit 11 has a duplex printing function, and performs duplex printing of images on first and second faces in a predetermined printing manner (i.e. in an electrophotographic manner, an inkjet manner or the like).

The image outputting unit 11 includes a print engine 11a that physically prints images on both faces of a print sheet (print paper sheet or the like) in a predetermined printing manner, and a sheet transportation unit 11b that transports the print sheet to the print engine 11a.

The operation panel 12 is arranged on a surface of a housing of this image forming apparatus 1, and includes a display device 12a and an input device 12b. The display device 12a includes a display panel that displays an input screen, an operation screen and/or the like, an indicator, and/or the like. The input device 12b includes a touch panel to form a soft key, a hard key, and/or the like.

The storage device 13 is a non volatile storage device such as a flash memory or a hard disk drive, and stores sorts of data and programs.

In the storage device 13, correction data 13a and test chart image data 13b have been stored. The correction data 13a is data that indicates adjustment values of an image printing position to be set to the image outputting unit 11 such that the adjustment value corresponds to a condition of the image outputting unit 11. The test chart image data 13b is image data (e.g. raster image data) of a test chart image mentioned below. The adjustment values include top timing adjustment values for the first and second faces (adjustment values of transportation timing of a top end of a print sheet to a transferring position in the electrophotographic manner), a center adjustment value (an adjustment value of an image center position in a primary scanning direction) and the like.

The communication device 14 is a peripheral device interface, a network interface or the like, and performs data communication with a host apparatus.

The processor 15 includes an ASIC (Application Specific Integrated Circuit) that performs a specific process as a hardware process, and a computer that performs a process described in a program as a software process, and acts as processing units using the ASIC and/or computer. The program to be executed by the processor 15 is stored in the storage device 13, and the computer in the processor 15 includes a CPU (Central Processing Unit), a ROM (Read Only Memory), a RAM (Random Access Memory) and the like, and loads a program from the ROM or the storage device 13 and executes the program using the CPU.

The processor 15 acts as a control unit 21, an image processing unit 22, and a correction processing unit 23.

The control unit 21 is a processing unit that controls the image outputting unit 11, the image processing unit 22 and/or the like to perform a job in accordance with a print request received by the communication device 14 from the host apparatus, a user operation to the operation panel 12, or the like.

In particular, the control unit 21 generates a test chart using the image outputting unit 11 and the like when receiving a user operation or the like for test chart generation. The current correction data 13 is applied when generating the test chart.

The control unit 21 controls the image outputting unit 11 to print test chart images for first and second faces based on test chart image data 13b on a print sheet in a duplex printing manner, and thereby generates a test chart. Details of the test chart are mentioned below. The aforementioned input device 12b receives manual input of a value of a position error indicated by the generated test chart (i.e. manual input of the measurement value of the position error in a current condition of the image forming apparatus 1). In duplex printing, if a transportation direction of a print sheet is reversed in a switch back manner after printing a front face, an image to be printed on a back face is rotated by 180 degrees.

The image processing unit 22 generates raster image data from a print request and performs a predetermined image process (color conversion, halftoning and the like), and thereby generates print image data to control the image outputting unit 11 so as to print an image to be printed.

The correction processing unit 23 generates correction data 13a for the image outputting unit 11 to reduce the position error, on the basis of the position error received by the input device 12b.

The next part explains a test chart image based on the test chart image data 13b.

Figure 2:
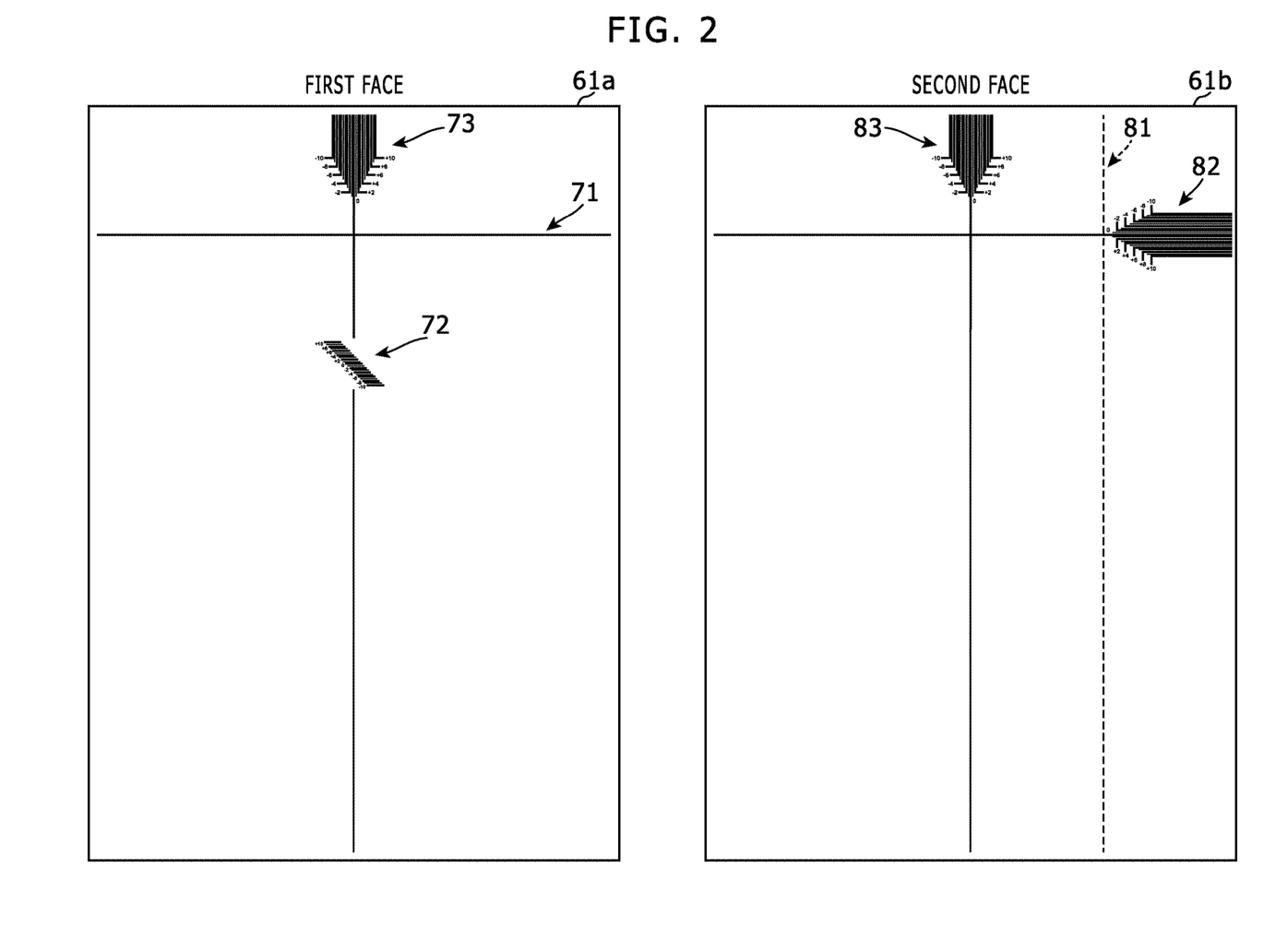
FIG. 2 shows a diagram that indicates an example of test chart images for a first face and a second face.

FIG. 2 shows a diagram that indicates an example of test chart images for a first face (here, front face) and a second face (here, back face).

Figure 3:
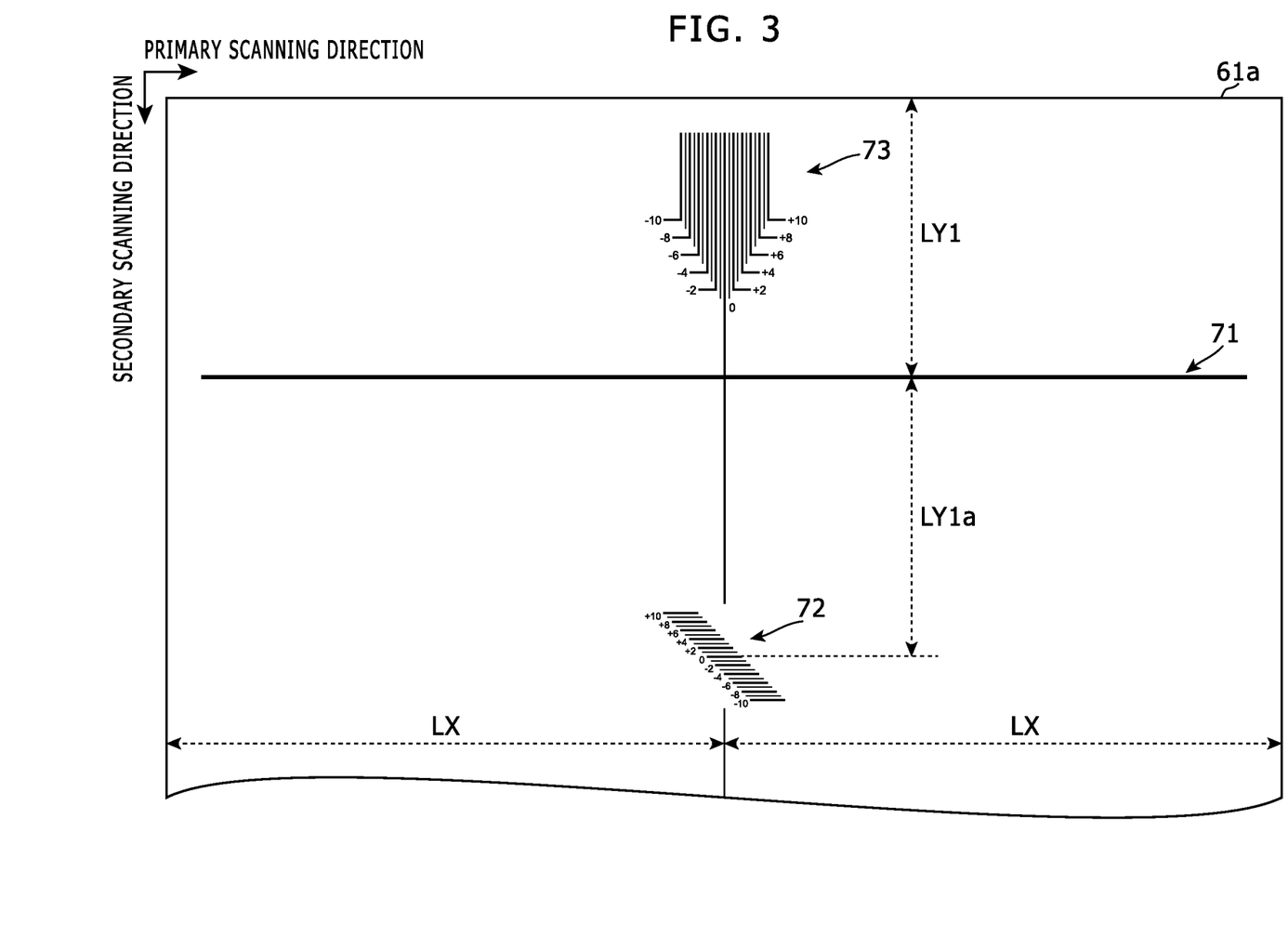
FIG. 3 shows a diagram that indicates details of the test chart image for the first face shown in FIG. 2.

FIG. 3 shows a diagram that indicates details of the test chart image for the first face shown in FIG. 2. A test chart image 61a shown in FIGS. 2 and 3 for the first face includes an indication image 71 and scale images 72 and 73; and the indication image 71 has a straight-line shape along a primary scanning direction, the scale image 72 has a scale along a secondary scanning direction, and the scale image 73 has a scale along the primary scanning direction.

Identical to each other are (a) a distance LY1 from a top end of the test chart image 61a to the indication image 71 and (b) a distance LY1a from the indication image 71 to a zero value position on the scale in the scale image 72. However, if a margin of a width dY is set at a top-end part when the test chart 61a is printed, the LY1a is equal to a sum of the distance LY1 and the width dY of the margin. A zero value position on the scale in the scale image 73 is set at a center of the test chart 61a in the primary scanning direction.

Figure 4:
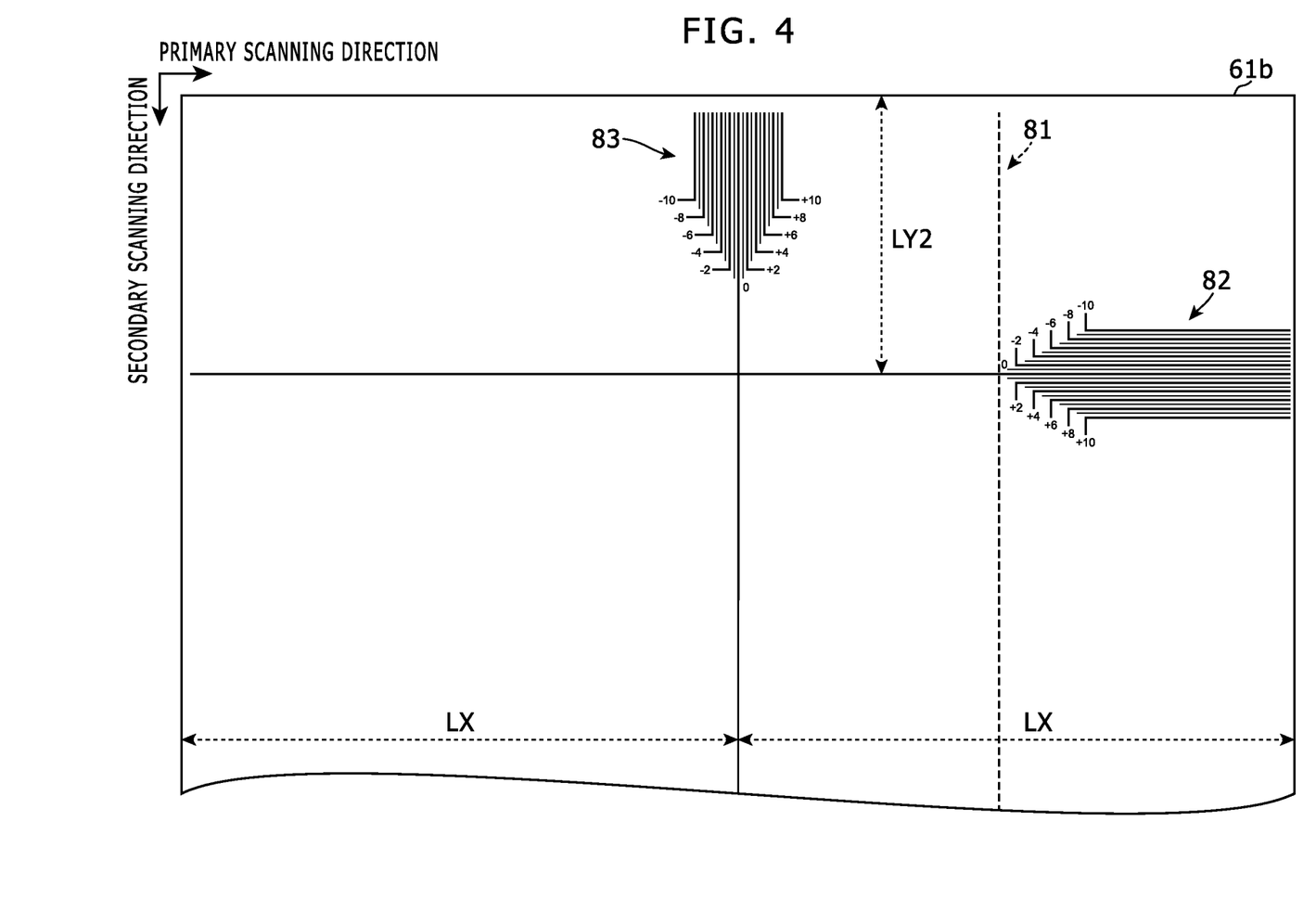
FIG. 4 shows a diagram that indicates details of the test chart image for the second face shown in FIG. 2.

FIG. 4 shows a diagram that indicates details of the test chart image for the second face shown in FIG. 2. A test chart image 61b shown in FIGS. 2 and 4 for the second face includes a folding back position image 81 along the secondary scanning direction, and scale images 82 and 83; and the scale image 82 has a scale along the secondary scanning direction, and the scale image 83 has a scale along the primary scanning direction.

Identical to each other are (a) a distance LY2 from a top end of the test chart image 61b to a zero value position of the scale image 82 and (b) the distance LY1 from the top end of the test chart image 61a to the indication image 71. A zero value position on the scale in the scale image 83 is set at a center of the test chart 61b in the primary scanning direction.

An interval between tickmark positions of numerical values in the aforementioned scales is set as a predetermined number of pixels, such that the number of pixels corresponding to a value read on the scale is enabled to be determined.

The next part explains a test chart generated by the image outputting unit 11.

Figure 5:
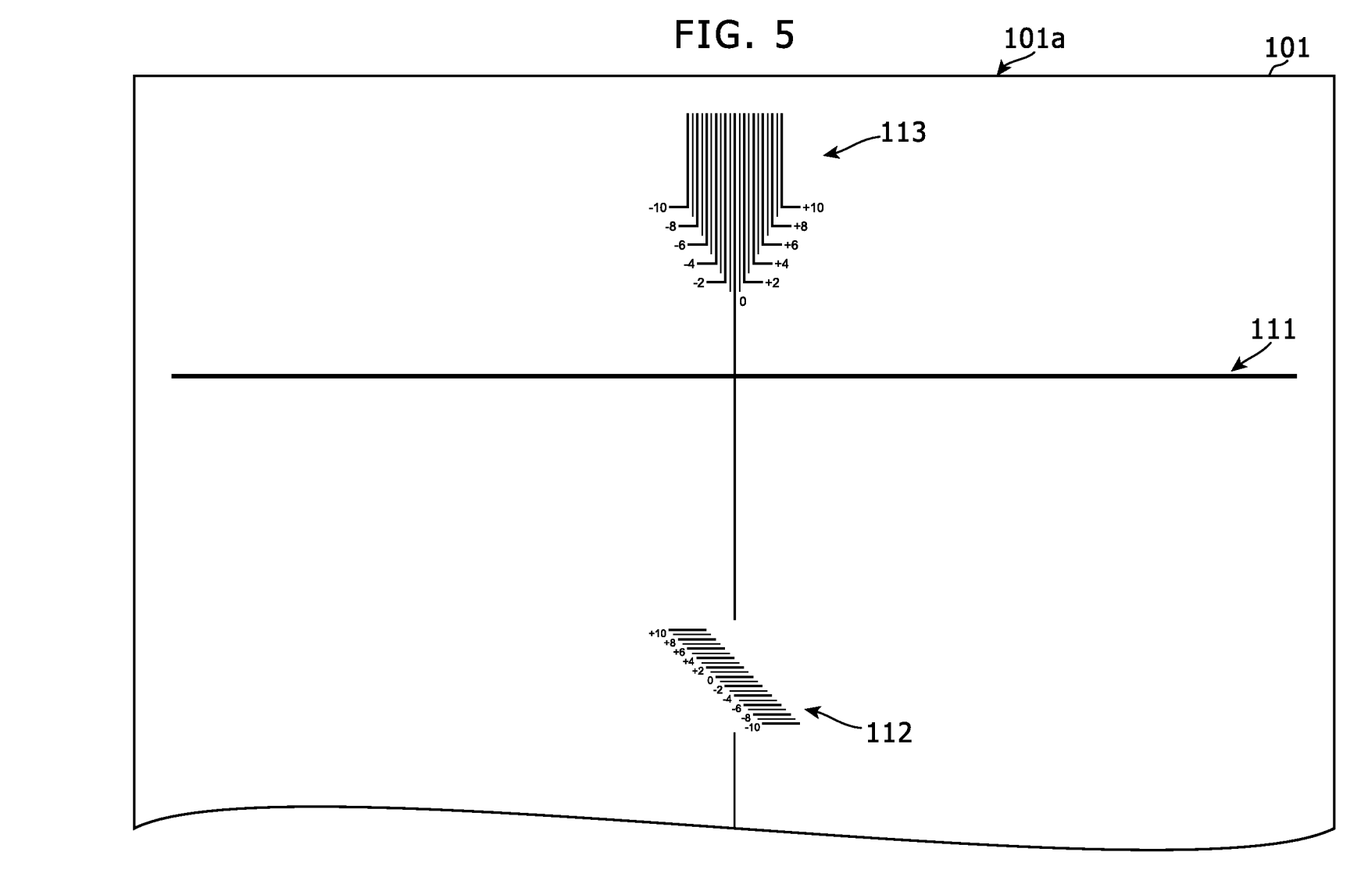
FIG. 5 shows a diagram that indicates an example of a first face of a test chart.

(a) Measurement of a Position Error in the Secondary Scanning Direction of the First Face Using the Test Chart FIG. 5 shows a diagram that indicates an example of a first face of a test chart. On the first face of the test chart 101 shown in FIG. 5, the aforementioned test chart 61a for the first face has been printed. Therefore, on the first face of the test chart 101, a straight-line shaped indication image 111 along a primary scanning direction, a scale image 112 that has a scale along a secondary scanning direction, and a scale image 113 that has a scale along the primary scanning direction have been printed. In the test chart 101, a position error may occur due to aging of the image forming apparatus 1, change of its environmental condition and/or the like.

Figure 6:
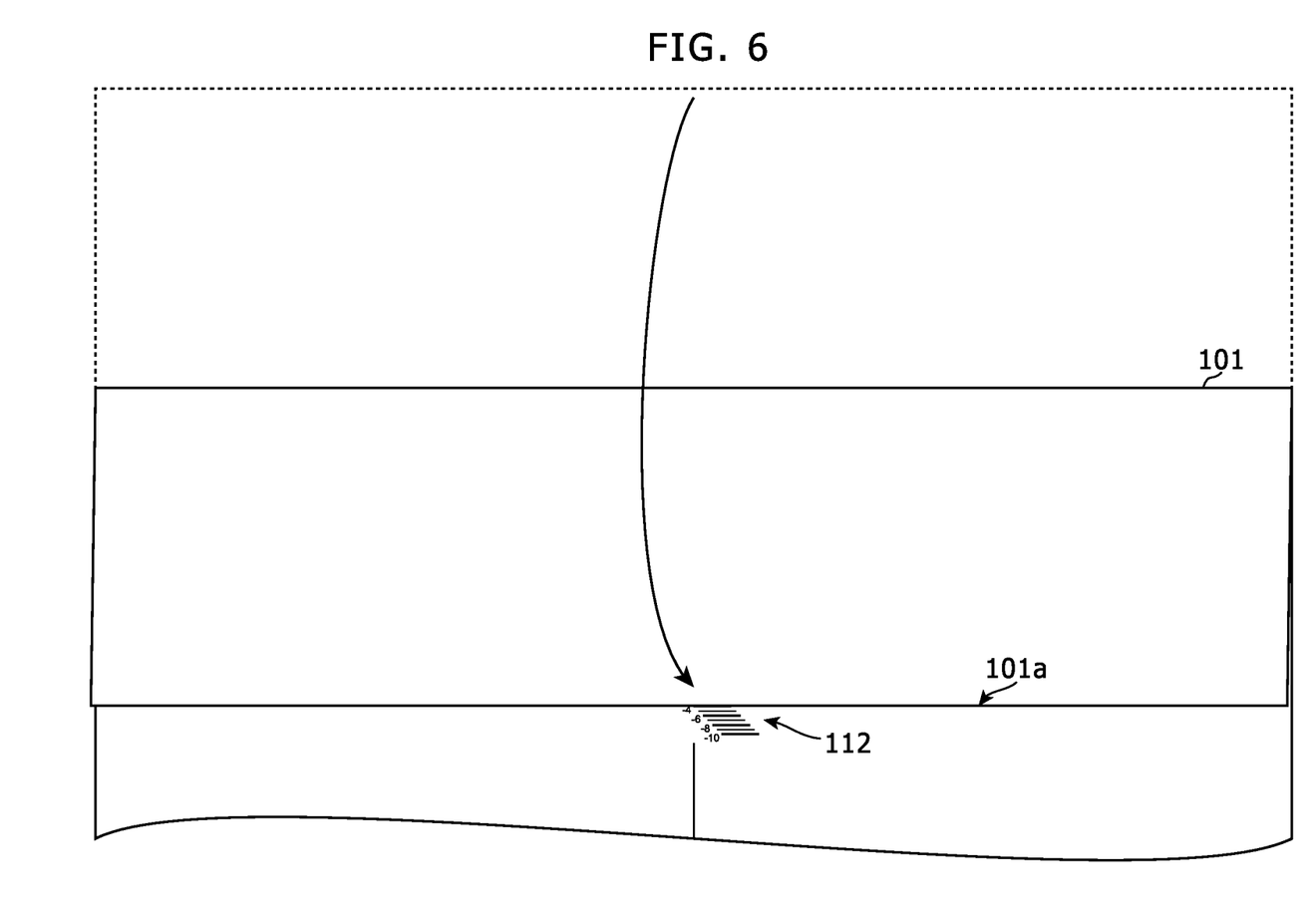
FIG. 6 shows a diagram that explains print image position error measurement with visual checking in a secondary scanning direction of the first face of the test chart 101 shown in FIG. 5.
Figure 7:
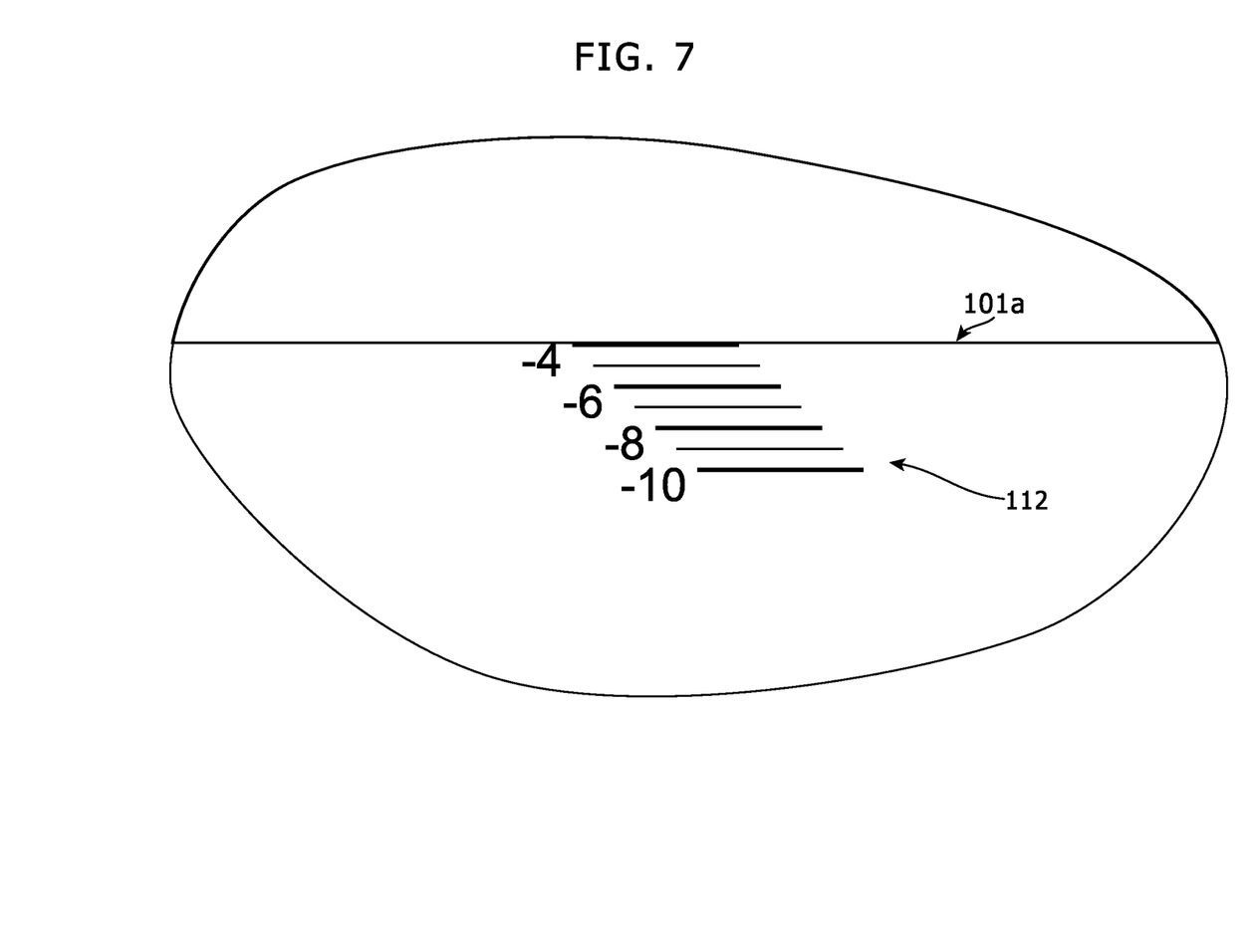
FIG. 7 shows a diagram that explains a measurement value read with a scale in the position error measurement shown in FIG. 6.

FIG. 6 shows a diagram that explains print image position error measurement with visual checking in a secondary scanning direction of the first face of the test chart 101 shown in FIG. 5. FIG. 7 shows a diagram that explains a measurement value read with a scale in the position error measurement shown in FIG. 6.

As shown in FIG. 6, when the test chart 101 is folded back at the indication image 111, a top end 101a of the test chart 101 indicates a value on the scale of the scale image 112 such that the value corresponds to a position error (an error from a predetermined reference value) in the secondary scanning direction of a print image on the first face. In the other words, a position of the scale image 112 is set such that the top end 101a of the folded-back test chart 101 indicates a zero value position on the scale of the scale image 112 when there are no position errors. In an example shown in FIG. 7, as a measurement value corresponding to a position error, the measurement value "−4" is read on the scale of the scale image 112.

In this manner, obtained is a measurement value corresponding to a position error of a printing position in the secondary scanning direction on the first face.

Figure 8:
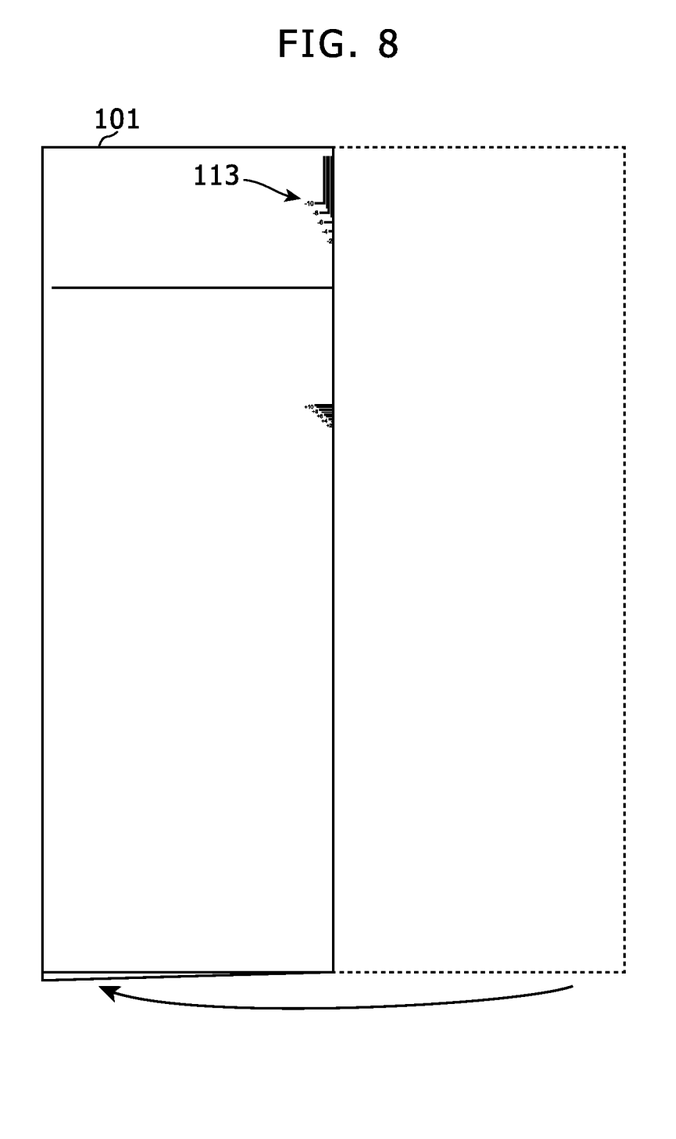
FIG. 8 shows a diagram that explains print image position error measurement with visual checking in a primary scanning direction of the first face of the test chart 101 shown in FIG. 5.
Figure 9:
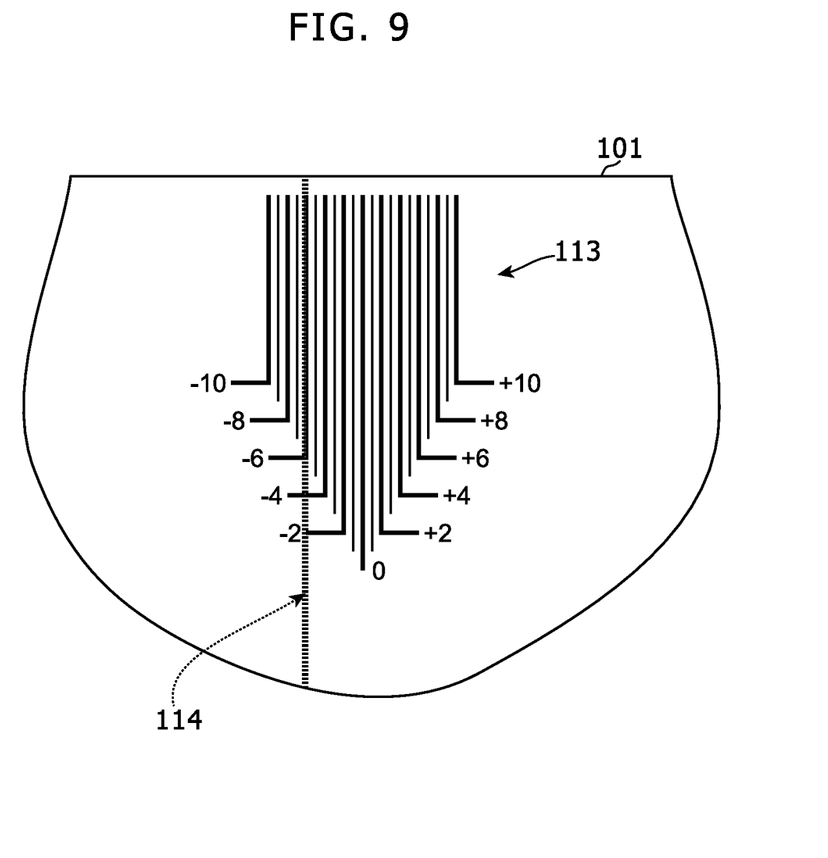
FIG. 9 shows a diagram that explains a measurement value read with a scale in the position error measurement shown in FIG. 8.

(b) Measurement of a Position Error in the Primary Scanning Direction of the First and Second Faces Using the Test Chart FIG. 8 shows a diagram that explains print image position error measurement with visual checking in the primary scanning direction of the first face of the test chart 101 shown in FIG. 5. FIG. 9 shows a diagram that explains a measurement value read with the scale in the position error measurement shown in FIG. 8.

As shown in FIG. 8, when the test chart 101 is folded back in half so as to form a crease along the secondary scanning direction, the crease 114 indicates a value on the scale of the scale image 113 such that the value corresponds to a position error in the primary scanning direction of a print image on the first face. In an example shown in FIG. 9, as a measurement value corresponding to a position error, the measurement value "−6" is read on the scale of the scale image 113.

In the same manner, on the second face, the crease 114 indicates a value on a scale of a scale image 121 mentioned below such that the value corresponds to a position error in the primary scanning direction of a print image on the second face.

In this manner, obtained are measurement values corresponding to position errors of printing positions in the primary scanning direction on the first and second faces.

Figure 10:
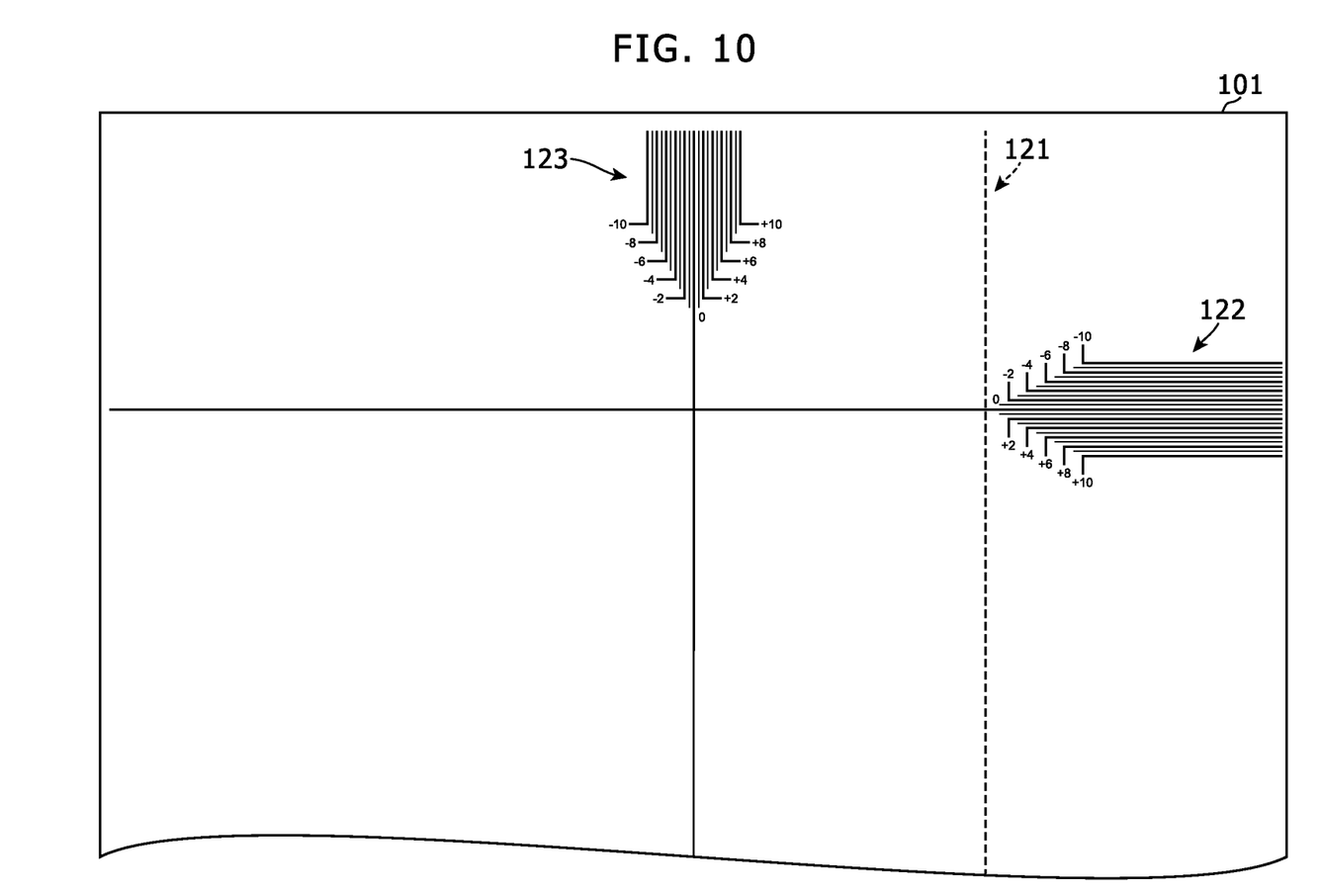
FIG. 10 shows a diagram that indicates an example of a second face of the test chart 101.

(c) Measurement of a Relative Position Error Between the First and Second Faces Using the Test Chart FIG. 10 shows a diagram that indicates an example of the second face of the test chart 101. On the second face of the test chart 101 shown in FIG. 10, the aforementioned test chart 61b for the second face has been printed. Therefore, on the second face of the test chart 101, a folding back position image 121 along the secondary scanning direction, a scale image 122 that has a scale along the secondary scanning direction, and a scale image 123 that has a scale along the primary scanning direction have been printed.

Figure 11:
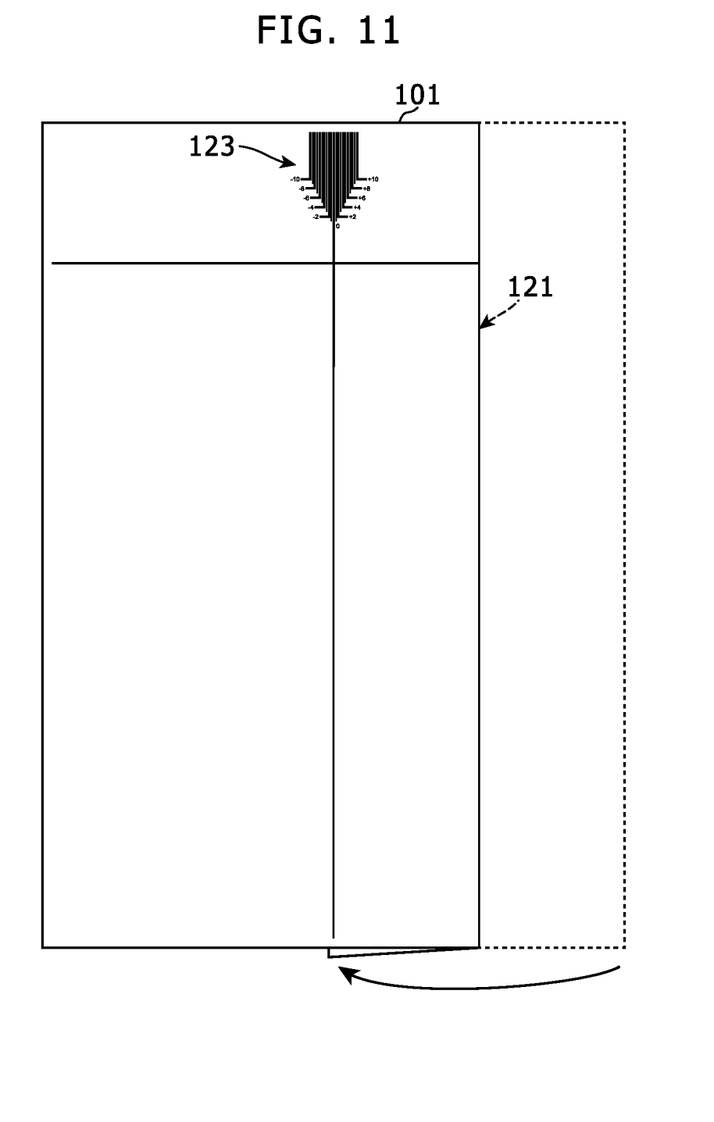
FIGS. 11 and 12 show diagrams that explain relative print image position error measurement between the first and second faces with visual checking in a secondary scanning direction of the test chart 101.
Figure 12:
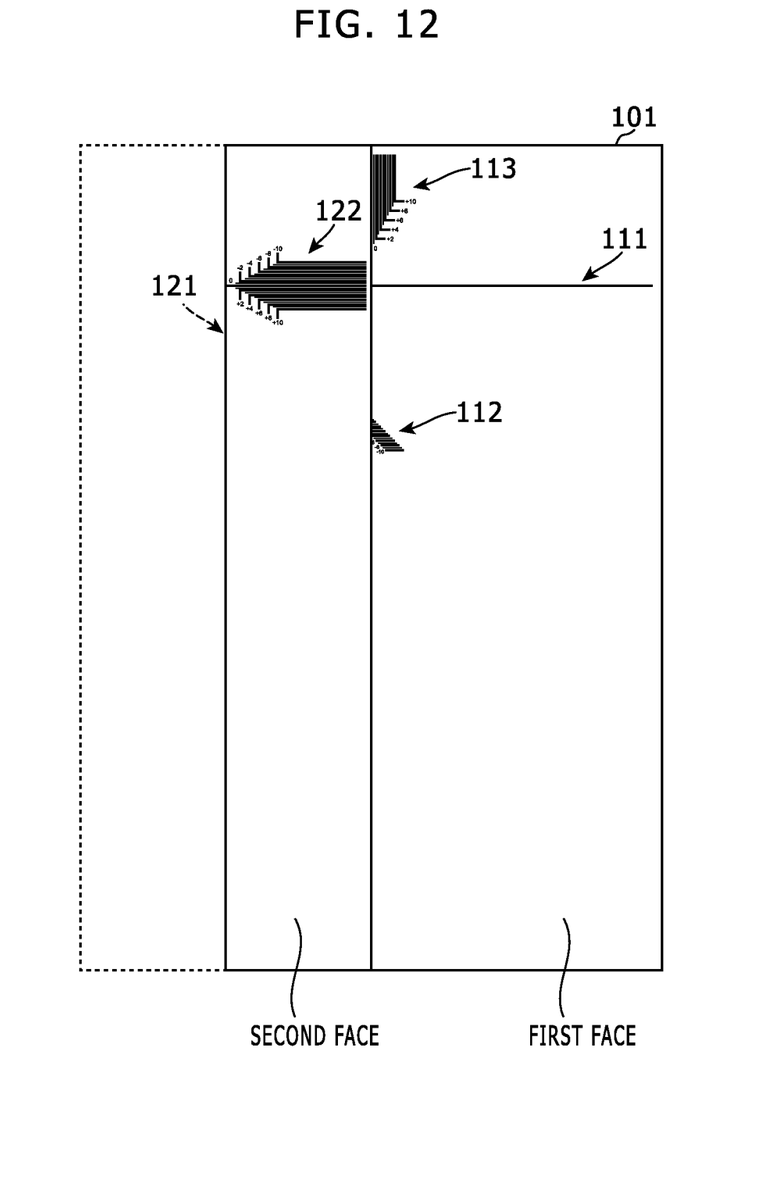
Figure 13:
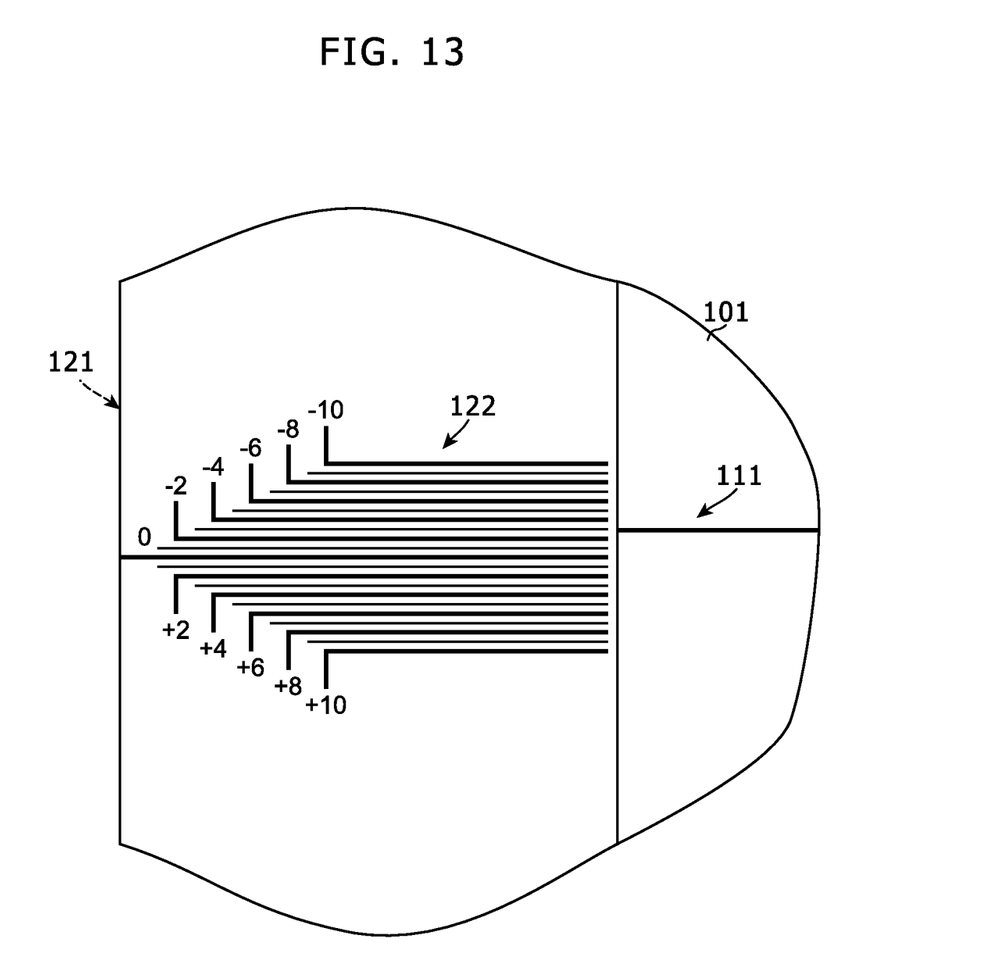
FIG. 13 shows a diagram that explains a measurement value read with a scale in the position error measurement shown in FIGS. 11 and 12.

FIGS. 11 and 12 show diagrams that explain relative print image position error measurement between the first and second faces with visual checking in a secondary scanning direction of the test chart 101. FIG. 13 shows a diagram that explains a measurement value read with the scale in the position error measurement shown in FIGS. 11 and 12.

As shown in FIGS. 11 and 12, when the second face is folded back to the first face at the folding back position image 121, the indication image 111 of the first face indicates as shown in FIG. 13, a value on the scale of the scale image 122 on the second face such that the value corresponds to a relative position error in the secondary scanning direction, between images on the first and second faces. In an example shown in FIG. 13, as a measurement value corresponding to a position error, the measurement value "−3" is read on the scale of the scale image 122.

In this manner, obtained is a measurement value corresponding to a relative position error between printing positions in the secondary scanning direction on the first and second faces. Front-to-back registration is performed on the basis of this measurement value.

As mentioned, these measurement values are inputted to the input device 12a of the operation panel 12 by a user or the like.

It should be noted that, as mentioned, in duplex printing, if a transportation direction of a print sheet is reversed in a switch back manner after printing a front face, an image to be printed on a back face is rotated by 180 degrees.

The following part explains a behavior of the image forming apparatus in Embodiment 1.

In accordance with a user operation or the like, the control unit 21 (a) performs a predetermined image process for the test chart image data 13b using the image processing unit 22, and (b) performs duplex printing of the aforementioned test chart images 61a and 61b or the like based on print image data obtained by the image process and thereby generates a test chart 101, as mentioned.

A user folds back the generated test chart 101 as mentioned, and reads a measurement value in the aforementioned manner, and operates the input device 12b in the operation panel 12 and thereby inputs the measurement value. Here, for example, in accordance with a user operation, the control unit 21 displays an input screen on the display device 12a, and detects each measurement value inputted to the input screen.

The correction processing unit 23 generates the correction data 13a to make the position error closer to zero on the basis of the position error received by the input device 12b as mentioned, and updates the correction data 13a stored in the storage device 13 with the generated correction data 13a. Each relationship between each value of the position error and each adjustment value in the correction data 13a is determined with an experiment or the like in advance, and has been installed into the correction processing unit 23 as a table, a conversion formula or the like.

After the updating, printing is performed using the updated correction data 13a.

As mentioned, in Embodiment 1, in the image forming apparatus 1, the control unit 21 controls the image outputting unit 11 to print test chart images for first and second faces based on test chart image data on a print sheet in a duplex printing manner, and thereby generates a test chart; the input device 12b receives manual input of a value of a position error indicated by the test chart 101; and the correction processing unit 23 generates correction data 13a for the image outputting unit 11 to reduce the position error, on the basis of the position error received by the input device 12b.

Further, this test chart 101 is a test chart obtained by duplex printing, and includes the straight-line shaped indication image 111 along the primary scanning direction on the first face, the folding back position image 121 along the secondary scanning direction on the second face, and the scale image 122 that has a scale along the secondary scanning direction on the second face. Furthermore, when the second face is folded back to the first face at the folding back position image 121, the indication image 111 indicates a value on the scale of the scale image 122 such that the value corresponds to a position error in the secondary scanning direction between images on the first and second faces.

Consequently, without requiring a scanner or a sensor to scan the test chart 101 printed out for adjusting the image forming apparatus 1, the test chart 101 enables to adjust the image forming apparatus 1 that printed out this test chart 101.

Embodiment 2

In Embodiment 2, the test chart image data 13b stored in the storage device 13 includes (a) image data of the test chart image 61a in a reference size for the first face, and (b) image data of the test chart image 61b in a reference size for the second face. The control unit 21 (a) trims the test chart images 61a and 61b in the reference size for the first and second faces to an image size corresponding to a size of the print sheet (i.e. a size of the test chart 101), and (b) controls the image outputting unit 11 to perform duplex printing of the trimmed test chart images 61a and 61b on the first and second faces and thereby generates the test chart 101.

Thus, in Embodiment 2, the test chart image data 13b stored in the storage device 13 does not include image data of plural sets of test chart images corresponding to plural sizes of a print sheet, but includes image data of a single set of test chart images 61a and 61b corresponding to a single size for the first and second faces.

Figure 14:
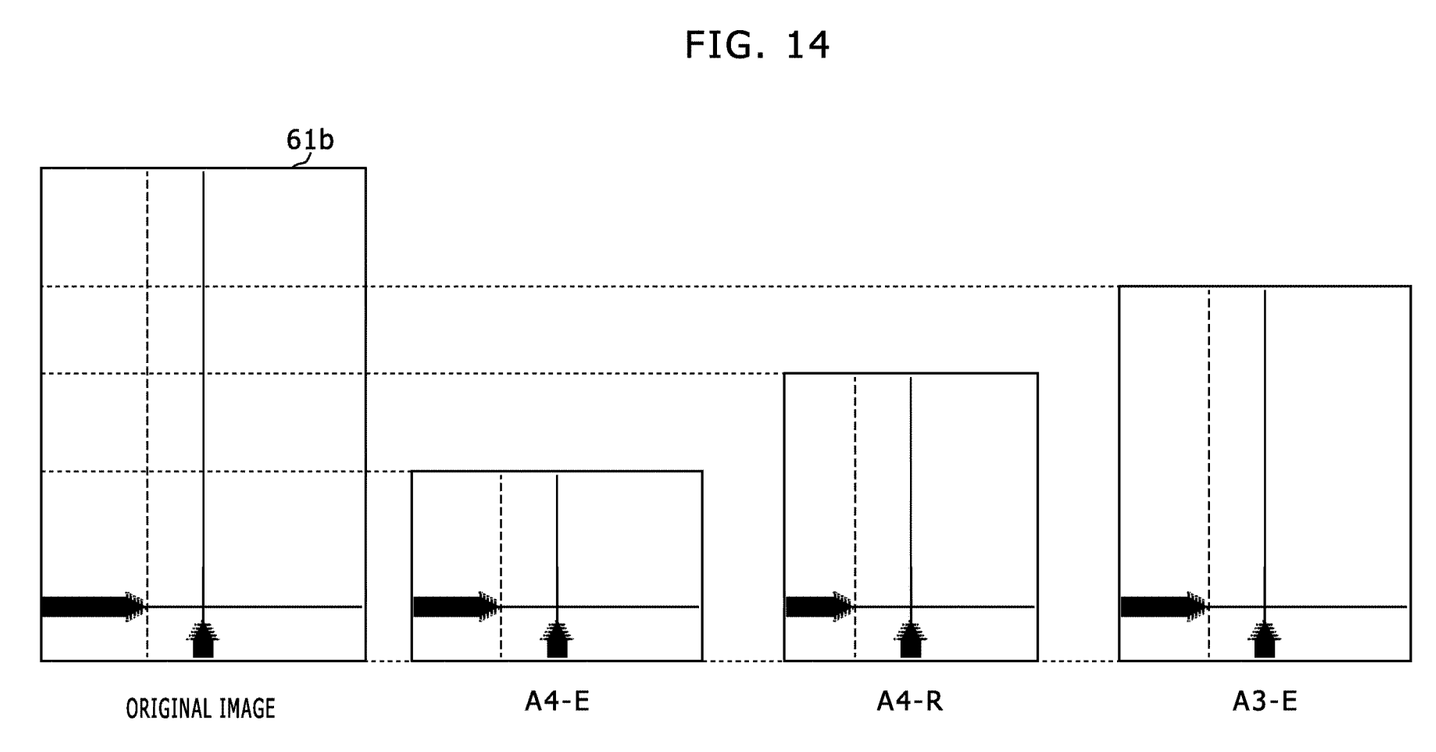
FIG. 14 shows a diagram that explains trimming of a test chart image in Embodiment 2.

FIG. 14 shows a diagram that explains trimming of a test chart image in Embodiment 2. As shown in FIG. 14, in accordance with a size of a print sheet (e.g. any of A4-E, A4-R, and A3-E in FIG. 14), the original image (the test chart image based on the test chart image data 13b stored in the storage device 13) rotated by 180 degrees is trimmed in the secondary scanning direction. In addition, in the primary scanning direction, the image is trimmed without changing a center of the image by equally removing both end parts of the image.

Other parts of the configuration and behaviors of the image forming apparatus in Embodiment 2 are identical or similar to those in Embodiment 1, and therefore not explained here.

As mentioned, in Embodiment 2, the test chart image data 13b includes (a) image data of the test chart image 61a in a reference size for the first face, and (b) image data of the test chart image 61b in a reference size for the second face. The control unit 21 (a) trims the test chart images 61a and 61b in the reference size for the first and second faces to an image size corresponding to a size of the print sheet (i.e. a size of the test chart 101), and (b) controls the image outputting unit 11 to perform duplex printing of the trimmed test chart images 61a and 61b on the first and second faces and thereby generates the test chart 101.

Consequently, a small memory area is sufficient for the test chart image data 13b.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned embodiment 1 or 2, a default adjustment value may be applied instead of the current correction data 13a when printing the test chart images 61a and 61b (i.e. when generating the test chart 101); and in such a case, the correction data 13a stored in the storage device 13 is updated with new correction data 13a obtained on the basis of the generated test chart 101. Contrarily, if the current correction data 13a is applied when printing the test chart images 61a and 61b (i.e. when generating the test chart 101), then new correction data 13a obtained on the basis of the generated test chart 101 is considered as a correction amount, new correction data 13a is derived on the basis of the current correction data 13a in the storage device 13 and this correction amount (e.g. as a sum of the both), and the correction data 13a stored in the storage device 13 is updated with the new correction data 13a.

What is claimed is:

1. A test chart obtained by duplex printing, comprising:
an indication image along a primary scanning direction on a first face, the indication image having a straight-line shape;
a folding back position image along a secondary scanning direction on a second face; and
a first scale image that has a scale along the secondary scanning direction on the second face;
wherein when the second face is folded back to the first face at the folding back position image, the indication image indicates a value on the scale of the first scale image such that the value corresponds to a position error in the secondary scanning direction between images on the first and second faces.

2. The test chart according to claim 1, further comprising a second scale image that has a scale along the secondary scanning direction on the first face;
wherein when the test chart is folded back at the indication image, a top end of the test chart indicates a value on the scale of the second scale image such that the value corresponds to a position error in the secondary scanning direction of a print image on the first face.

3. The test chart according to claim 1, further comprising:
a third scale image that has a scale along the primary scanning direction on the first face; and
a fourth scale image that has a scale along the primary scanning direction on the second face;
wherein when the test chart is folded back in half so as to form a crease along the secondary scanning direction, (a) the crease indicates a value on the scale of the third scale image such that the value corresponds to a position error in the primary scanning direction of a print image on the first face, and (b) the crease indicates a value on the scale of the fourth scale image such that the value corresponds to a position error in the primary scanning direction of a print image on the second face.

4. An image forming apparatus, comprising:
an image outputting unit configured to perform duplex printing of images on first and second faces in a predetermined printing manner;
a control unit configured to control the image outputting unit to perform duplex printing of a test chart image on a first face of a print sheet and a test chart image on a second face of the print sheet in the basis of test chart image data and thereby generate a test chart;
an input device configured to receive manual input of a value of a position error indicated by the test chart; and
a correction processing unit configured to generate correction data for the image outputting unit in order to reduce the position error, on the basis of the value of the position error received by the input device;
wherein the test chart comprises:
an indication image along a primary scanning direction on the first face, the indication image having a straight-line shape;
a folding back position image along a secondary scanning direction on the second face; and
a first scale image that has a scale along the secondary scanning direction on the second face;
wherein when the second face is folded back to the first face at the folding back position image, the indication image indicates a value on the scale of the first scale image such that the value corresponds to a position error in the secondary scanning direction between images on the first and second faces.

5. The image forming apparatus according to claim 4, further comprising a storage device in which the test chart image data has been stored;

wherein the test chart image data includes image data of the test chart image in a reference size for the first face, and image data of the test chart image in a reference size for the second face; and     the control unit (a) trims the test chart images in the reference size for the first and second faces to an image size corresponding to a size of the print sheet, and (b) controls the image outputting unit to perform duplex printing of the trimmed test chart images on the first and second faces and thereby generates the test chart.

\* \* \* \* \*